(12) United States Patent
Yoshimi et al.

(10) Patent No.: US 8,875,841 B2
(45) Date of Patent: Nov. 4, 2014

(54) TRANSMISSION

(75) Inventors: Takuya Yoshimi, Nishio (JP); Toshiya Uematsu, Kariya (JP); Masaki Kawamoto, Okazaki (JP); Norio Kayukawa, Konan (JP); Hiroyuki Kato, Kariya (JP); Shiro Ogami, Kariya (JP)

(73) Assignee: Aisin Ai Co., Ltd., Nishio-shi (JP)

( * ) Notice: Subject to any disclaimer, the term of this patent is extended or adjusted under 35 U.S.C. 154(b) by 263 days.

(21) Appl. No.: 13/496,067

(22) PCT Filed: Jun. 17, 2010

(86) PCT No.: PCT/JP2010/060305
§ 371 (c)(1),
(2), (4) Date: Mar. 14, 2012

(87) PCT Pub. No.: WO2011/033833
PCT Pub. Date: Mar. 24, 2011

(65) Prior Publication Data
US 2012/0178571 A1 Jul. 12, 2012

(30) Foreign Application Priority Data
Sep. 15, 2009 (JP) .................................. 2009-212759

(51) Int. Cl.
*F16H 57/04* (2010.01)
*F16H 3/00* (2006.01)
*F16H 3/093* (2006.01)

(52) U.S. Cl.
CPC ............ *F16H 3/006* (2013.01); *F16H 57/0423* (2013.01); *F16H 2200/0056* (2013.01); *F16H 57/0494* (2013.01); *F16H 57/0409* (2013.01); *F16H 2003/0931* (2013.01)
USPC ...................................................... 184/6.12

(58) Field of Classification Search
USPC ...................................................... 184/6.12
See application file for complete search history.

(56) References Cited

U.S. PATENT DOCUMENTS 1,220,810 A * 3/1917 Alquist .......................... 184/6.12
1,220,811 A * 3/1917 Alquist .......................... 74/421 R (Continued)

FOREIGN PATENT DOCUMENTS

| EP | 1 635 090 A2 | 3/2006 |
|----|----|----|
| EP | 1 635 090 A3 | 3/2006 |
| EP | 1 775 499 A1 | 4/2007 |
| EP | 2 447 574 A1 | 5/2012 |
| JP | 33 4206 | 3/1958 |
| JP | 54 164358 | 11/1979 |
| JP | 09 177948 | 7/1997 |
| JP | 11 257466 | 9/1999 |
| JP | 2000 274518 | 10/2000 |
| JP | 2001 254811 | 9/2001 |
| JP | 2004 308677 | 11/2004 |
| JP | 2006-77894 A | 3/2006 |
| JP | 2008 248987 | 10/2008 |
| JP | 2011-7208 A | 1/2011 |

OTHER PUBLICATIONS

Japanese Office Action Issued Jun. 18, 2013 in Patent Application No. 2009-212759 (with English translation).
Extended European Search Report issued Jan. 28, 2013 in Patent Application No. 10816946.7.
International Search Report issued on Jul. 27, 2010 in PCT/JP10/060305 filed on Jun. 17, 2010.
U.S. Appl. No. 13/380,217, filed Dec. 22, 2011, Kawamoto et al.

*Primary Examiner* — Henry Liu
(74) *Attorney, Agent, or Firm* — Oblon, Spivak, McClelland, Maier & Neustadt, L.L.P.

(57) ABSTRACT

In a transmission, a lubrication oil retention section is formed to surround an area around a circumferential part of a first gear that ranges from a lubrication oil storage region to the outside of the lubrication oil storage region. In the lubrication oil retention section, the lubrication oil scooped up by the rotation of the first gear is retained between the lubrication oil retention section and the first gear at the outside of the lubrication oil storage region. The lubrication oil retention section enables the first gear to splash the lubrication oil retained at the outside of the lubrication oil storage region, toward a receiver that flows the lubrication oil to various sliding parts of the transmission.

9 Claims, 4 Drawing Sheets

(56) References Cited

U.S. PATENT DOCUMENTS

| | | | |
|---|---|---|---|
| 2,292,086 A * | 8/1942 | Pritchard | 184/11.1 |
| 2,633,208 A * | 3/1953 | Randt | 184/13.1 |
| 2,645,305 A * | 7/1953 | Roos | 184/11.1 |
| 3,529,698 A * | 9/1970 | Nelson | 184/6.12 |
| 3,601,515 A | 8/1971 | Pelizzoni | |
| 4,414,861 A * | 11/1983 | Witt | 74/606 A |
| 4,577,524 A * | 3/1986 | Richards et al. | 74/411.5 |
| 4,693,133 A * | 9/1987 | Tomita et al. | 74/467 |
| 4,721,184 A * | 1/1988 | Sowards | 184/6.12 |
| 4,928,551 A * | 5/1990 | Connelly et al. | 74/606 R |
| 6,969,335 B2 * | 11/2005 | Lorken | 475/302 |
| 7,059,443 B2 * | 6/2006 | Kira | 180/243 |
| 7,140,995 B2 * | 11/2006 | Mierisch et al. | 475/221 |
| 7,686,137 B2 * | 3/2010 | Tominaga et al. | 184/6.12 |
| 7,984,791 B2 * | 7/2011 | Taguchi et al. | 184/6.12 |
| 2010/0319486 A1 | 12/2010 | Kawamoto et al. | |
| 2012/0096968 A1 | 4/2012 | Kawamoto et al. | |

\* cited by examiner

TRANSMISSION

TECHNICAL FIELD

The present invention relates to a transmission in which a speed change gear scoops up lubrication oil for lubrication.

BACKGROUND ART

Heretofore, in vehicle transmissions which change the speed of the driving power from an internal combustion engine or the like, there is one in which a speed change gear scoops up lubrication oil for lubrication. For example, JP 2001-254811 A (Patent Document 1) discloses a lubrication mechanism of a transmission having an oil receiver. In the lubrication mechanism, the lubrication oil scooped up by the speed change gear is caught by the oil receiver and is supplied to tooth surfaces of other speed change gears and the interiors of respective shafts.

PRIOR ART DOCUMENT

Patent Document

Patent Document 1: JP2001-254811 A

SUMMARY OF THE INVENTION

Problem to be Solved by the Invention

In the lubrication mechanism of the transmission like this, an agitation resistance is produced because the speed change gear scoops up the lubrication oil stored in a case. An increase in the agitation resistance causes a power loss of the transmission and is feared to largely influence on the driving of the vehicle as well as on the fuel efficiency.

The present invention has been made taking the aforementioned problem into consideration, and an object thereof is to provide a transmission capable of diminishing the agitation resistance.

Solution to the Problem

In order to solve the aforementioned problem, a transmission of the invention comprises a case; a plurality of gears rotatably supported in the case; lubrication oil contained in the case; a lubrication oil storage region formed in the case, storing the lubrication oil, and enabling the stored lubrication oil to be scooped up by the rotation of a first gear of the plurality of gears above the first gear; a receiver for flowing the lubrication oil scooped up upward by the rotation of the first gear to sliding parts of the gears; and a lubrication oil retention section formed to surround an area around the circumferential part of the first gear that ranges from the lubrication oil storage region to the outside of the lubrication oil storage region, and being capable of retaining the lubrication oil scooped up by the rotation of the first gear between itself and the first gear at the outside of the lubrication oil storage region and enabling the first gear to splash toward the receiver the lubrication oil retained at the outside of the lubrication oil storage region.

According to the transmission of the present invention, the lubrication oil retention section is formed to surround the circumferential part of the first gear rotatably supported in the case, and at least a part of an end portion on the lower side of the lubrication oil retention section is immersed in the lubrication oil stored in the lubrication oil storage region. Therefore, the lubrication oil retention section enables much more lubrication oil to be scooped up to a position above the first gear where the lubrication oil is splashed toward the receiver. Further, the lubrication oil stored in the lubrication oil storage region is partitioned by the lubrication oil retention section, so that a proper quantity of the lubrication oil can be stored around the circumferential part of the first gear.

Then, spaces for retaining the lubrication oil scooped up by the rotation of the first gear from the lubrication oil storage region are provided between the first gear and the lubrication oil retention section. Further, the lubrication oil retention section enables the first gear to splash toward the receiver the lubrication oil retained at the outside of the lubrication oil storage region. For example, one end of the lubrication oil retention section is formed not to intercept the lubrication oil splashing from the first gear toward the receiver but to surround the first gear up to the vicinity of a part thereof where the lubrication oil is splashed.

By taking the construction like this, the first gear can efficiently scoop up the lubrication oil stored in the lubrication oil storage region. Thus, since the first gear can splash much more lubrication oil toward the receiver, the transmission can be improved in lubricating ability. Further, in the lubrication oil storage region, the lubrication oil agitated by the first gear is mainly the lubrication oil existing between the first gear and the lubrication oil retention section. That is, the oil quantity of the lubrication oil agitated by the first gear can be lessened in comparison with that in the prior art. This results in diminishing the agitation resistance caused by the first gear. Therefore, the power loss in the transmission can be decreased. Further, since the lubrication oil can be efficiently circulated in the interior of the transmission, the oil quantity of the lubrication oil to be contained in the case can be decreased.

Further, the present invention may take a construction that in the lubrication oil retention section, falling prevention portions capable of retaining on side surfaces of the first gear the lubrication oil that is retained by the lubrication oil retention section and that has been scooped up by the rotation of the first gear are bodily joined or formed along upper portions of the side surfaces of the first gear that are above an axis center of the first gear.

With this construction, the lubrication oil that has been retained by the lubrication oil retention section after being scooped up by the first gear is retained by the falling prevention portions also on the side surfaces of the first gear. When scooped up above the axis center of the first gear, the lubrication oil is liable to fall from between the lubrication oil retention section and the side surfaces of the first gear. Therefore, by further providing the falling prevention portions like that, it becomes possible to prevent the falling of the lubrication oil and to retain a sufficient quantity of the lubrication oil at the circumferential part of the first gear. Accordingly, since the first gear can supply much more lubrication oil toward the receiver, the transmission can be improved in lubricating ability.

Then, the falling prevention portions are constructed to be joined or formed bodily with the lubrication oil retention section. Thus, the relative positioning of the lubrication oil retention section relative to the first gear becomes easy. Further, by the bodily fastening or formation, the lubrication oil can be prevented from leaking out from clearances between the lubrication oil retention section and the falling prevention portions. Accordingly, the lubrication oil can be retained more reliably at the circumferential part of the first gear.

Also in the present invention, the lubrication oil retention section may be constructed to take a U-letter shape that surrounds the circumferential surface and the both side surfaces of the circumferential part of the first gear. With this construction, the lubrication oil retention section is constructed to take the U-letter shape. That is, the lubrication oil retention section is formed to follow the section in the axial direction of the first gear that scoops up the lubrication oil. Thus, the spaces between the first gear and the lubrication oil retention section are each set to become a predetermined distance, and the circumferential part of the first gear can scoop up the lubrication oil without imbalance. Therefore, the lubrication oil can be scooped up more efficiently.

Also in the present invention, a U-letter shape opening portion of the lubrication oil retention section that is below the axis center of the first gear may take a construction that it is formed to spread out. With this construction, the lubrication oil retention section takes the construction that the U-letter shape opening portion is formed to spread out. In the interior of the transmission, the lubrication oil is circulated by being splashed by the first gear, other gears and the like. Therefore, the U-letter shape opening portion of the lubrication oil retention section that is positioned below the axis center of the first gear is formed to spread out. Thus, the lubrication oil splashing in the vicinity of the lubrication oil storage region or falling from above the first gear can be collected inside the lubrication oil retention section.

Also in the present invention, the lubrication oil retention section may take a construction that it is composed of two side members respectively secured to first and second case sections which constitute the case and that when the second case section is fastened to the first case section, the two side members surround the circumferential surface and the both side surfaces of the circumferential part of the first gear.

With this construction, it is possible to easily set the lubrication oil retention section adapted to the shape of the first gear that scoops up the lubrication oil. Here, it may be the case that the case of the transmission is composed of the first case section and the second case section which are fastened at a place for receiving the first gear. Therefore, the lubrication oil retention section is made to be composed of the two side members secured respectively to the first case section and the second case section. The two side members surround the circumferential part and the both side surfaces of the first gear and constitute the lubrication oil retention section when the second case section is fastened to the first case section. For example, for the purpose of alteration in the gear change ratio in the practical use, gears of plural kinds may be replaced and received within the same case. In this case, by taking the aforementioned construction, adaptation can be made to replaced gears of many kinds including the first gear. Further, it is possible to set the shape of the lubrication oil retention section to be adapted to the oil quantity and kind of the lubrication oil stored in the case.

Also in the present invention, the first gear may be constructed to be a gear of the plurality of gears that is rotated at all times during the vehicle travelling. With this construction, it is possible to scoop up the lubrication oil at all times during the vehicle travelling that requires the lubrication in the interior of the transmission. Thus, since the lubrication oil is supplied stably toward the receiver, it is possible to efficiently circulate the lubrication oil in the interior of the transmission.

Further, the present invention may take a construction that it is an automatic dual-clutch transmission which further comprises a first input shaft and a second input shaft arranged concentrically and rotatably supporting gears on a drive side of the plurality of gears; a first output shaft and a second output shaft arranged in parallel to the first input shaft and rotatably supporting gears on a driven side of the plurality of gears; and a dual clutch having a first clutch for transmitting a rotational driving power of a prime mover to the first input shaft and a second clutch for transmitting the rotational driving power to the second input shaft, wherein the first gear is a ring gear of a differential gear which is rotationally connected to the first output shaft and the second output shaft at all times.

With this construction, the transmission is constructed to be the automatic dual-clutch transmission. The automatic dual-clutch transmission is a mechanism which makes high-speed shift changes possible by switching the connections of an internal combustion engine with the first input and output shafts and the second input and output shafts by the two clutches. Then, in this transmission, it occurs that when the input and output shafts on one side are connected by the clutch with the internal combustion engine, the input and output shafts on the other side are not rotationally driven. In the automatic dual-clutch transmission like this, by using, as the first gear which scoops up the lubrication oil, the ring gear of the differential gear rotationally connected to the first output shaft and the second output shaft at all times, it results that the lubrication oil can be scooped up at all times during the vehicle travelling, so that the transmission can be improved in lubricating ability.

Further, it is often the case that generally, the ring gear of the differential gear in the transmission is large in diameter among the plurality of gears received in the case and is located at the lowest position. Therefore, by using the ring gear of the differential gear as the first gear, it is possible to scoop up the lubrication oil more efficiently from the lubrication oil storage region defined at the bottom portion of the case. Further, the ring gear of the differential gear is constructed as the final gear in the transmission. Thus, the agitation resistance exerted on the ring gear is transmitted to the internal combustion engine being a driving source through a plurality of gears that have a reduction ratio depending on the shift position. Therefore, it is possible to decrease the power resistance that the agitation resistance exerted on the first gear works on the internal combustion engine.

FORM FOR PRACTICING THE INVENTION

Hereafter, an embodiment to which a transmission of the present invention is embodied will be described with reference to FIGS. 1 to 6.

<Construction of Transmission 1>

Figure 1:
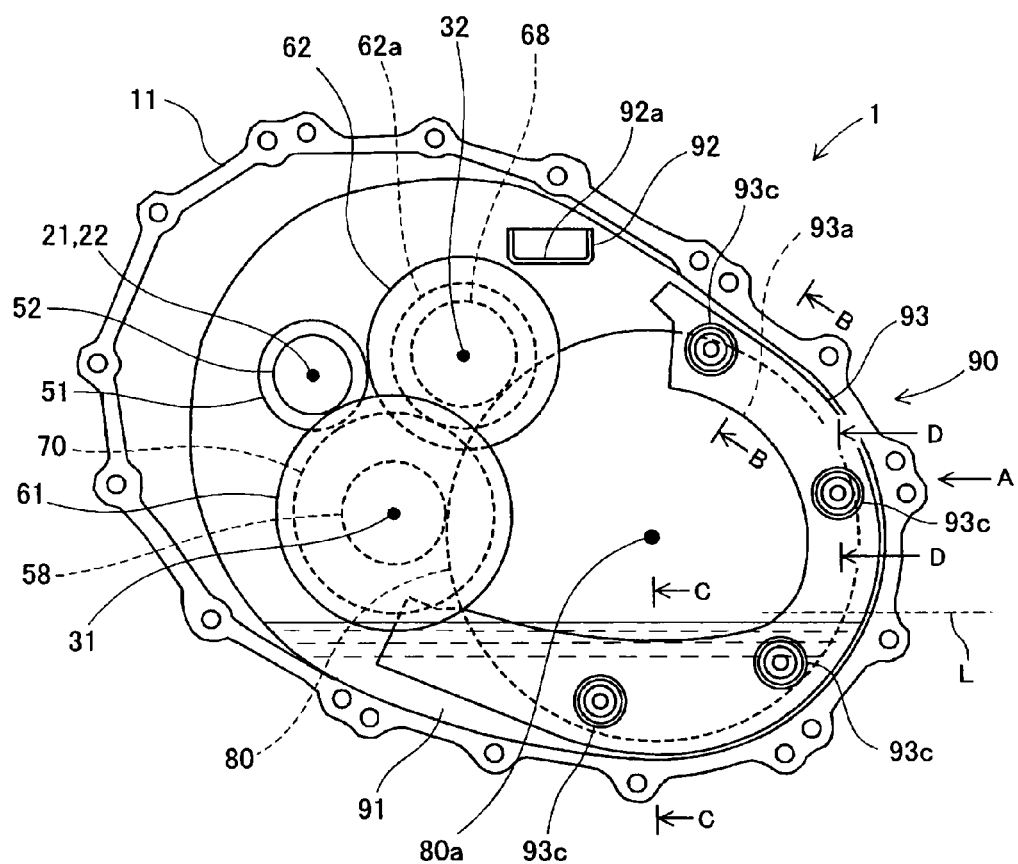
[FIG. 1] is a structural view showing some gears of a transmission 1 as viewed in the axial direction.
Figure 2:
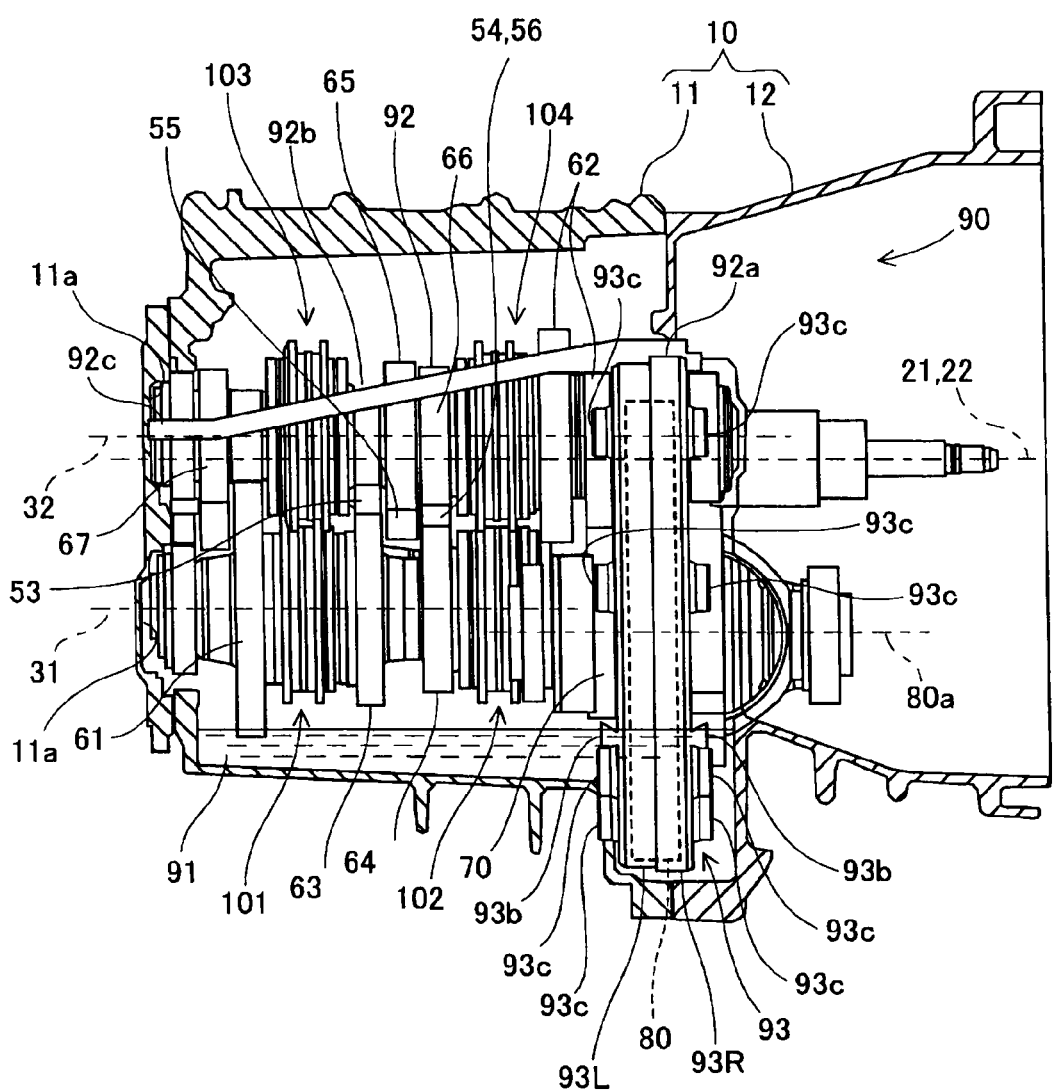
[FIG. 2] is a sectional schematic view as viewed in the A-direction in FIG. 1 and a view schematically showing sliding parts and lubrication oil received in a case 10 with a mission case 11 and a clutch housing 12 of the case 10 taken as section.
Figure 3:
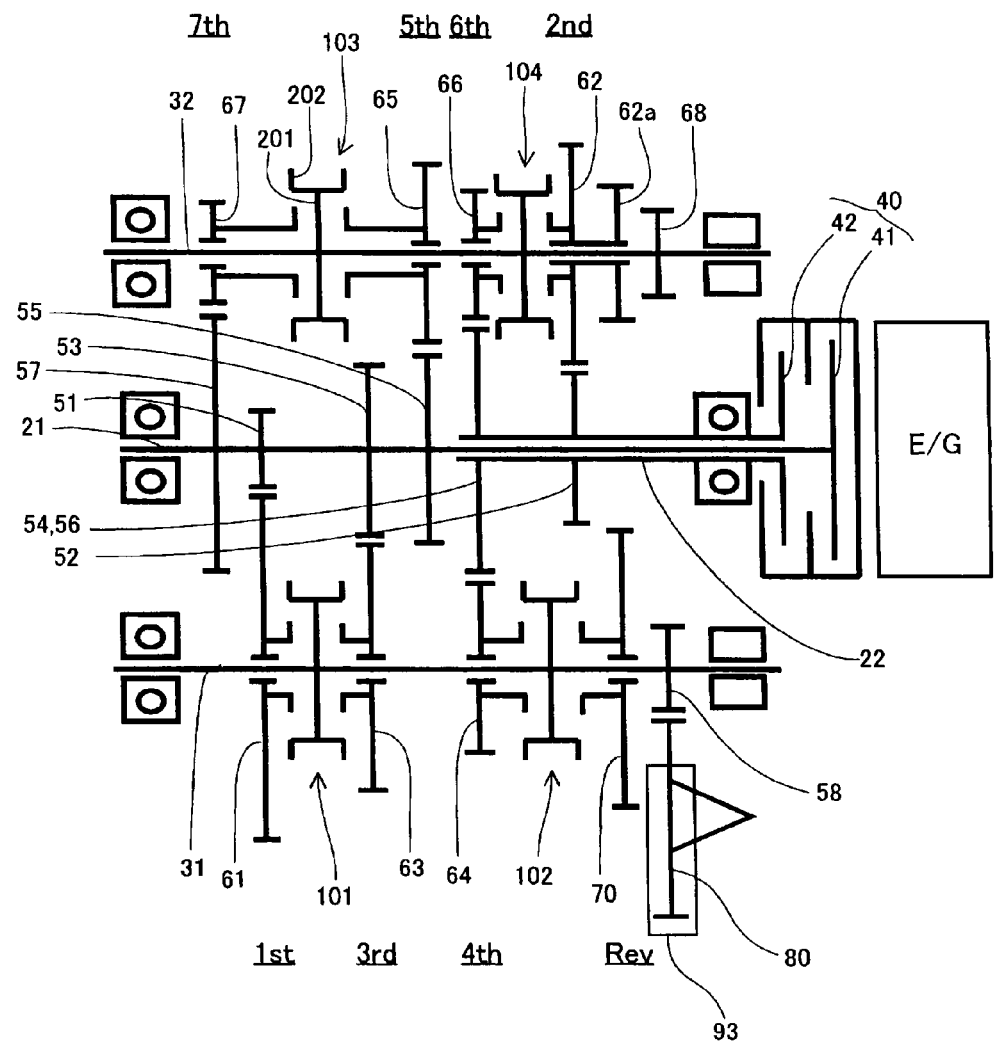
[FIG. 3] is a skeletal figure showing the entire structure of the transmission 1.

As shown in FIGS. 1 to 3, the transmission 1 in the present embodiment is an automatic dual-clutch transmission and is provided in a case 10 with a first input shaft 21, a second input shaft 22, a first output shaft 31, a second output shaft 32, a dual clutch 40, drive gears 51-57 (corresponding to "gears on a drive side" in the present invention), final reduction drive gears 58, 68, driven gears 61-67 for the respective speed change stages, a reverse gear 70, a ring gear 80 (corresponding to "first gear" in the present invention), and a lubrication mechanism 90. The final reduction drive gears 58, 68, the driven gears 61-67 and the reverse gear 70 correspond to "gears on a driven side" in the present invention.

As shown in FIG. 2, the case 10 has a mission case 11 (corresponding to "first case section" in the present invention) and a clutch housing 12 (corresponding to "second case section" in the present invention). The mission case 11 rotatably supports the respective shafts through a plurality of bearings and stores lubrication oil for lubricating sliding parts including the aforementioned plurality of gears and sleeves. The clutch housing 12 has an end surface facing an end surface of the mission case 11 and is secured by bolt-fastening. The clutch housing 12 rotatably supports the respective shafts through a plurality of bearings and contains the dual clutch 40 therein.

The first input shaft 21 takes a hollow spindle-like shape and is supported by the bearings to be rotatable relative to the mission case 11. Bearing support portions and a plurality of external splines are formed on the outer surface of the first input shaft 21. A 1st speed drive gear 51 and a large-diameter 3rd speed drive gear 53 are formed directly on the first input shaft 21. A 5th speed drive gear 55 and a 7th speed drive gear 57 are press-fitted on the external splines formed on the outer surface of the first input shaft 21. Further, the first input shaft 21 has formed thereon a coupling portion connectable with a first clutch 41 of the dual clutch 40.

The second input shaft 22 takes a hollow spindle-like shape, is rotatably supported on the outer surface of a part of the first input shaft 21 through a plurality of bearings and is rotatably supported by a bearing relative to the clutch housing 12. That is, the second input shaft 22 is arranged to be concentric with, and rotatable relative to, the first input shaft 21. Like the first input shaft 21, bearing support portions and a plurality of external gears are formed on the outer surface of the second input shaft 22. A 2nd speed drive gear 52 and a large-diameter 4th speed and 6th speed drive gear 54, 56 are formed on the second input shaft 22. Further, the second input shaft 22 has formed thereon a coupling portion connectable to a second clutch 42 of the dual clutch 40.

The first output shaft 31 is supported by the bearings to be rotatable relative to the mission case 11 and the clutch housing 12 and is arranged in the mission case 11 in parallel to the first input shaft 21. On the outer surface of the first output shaft 31, the final reduction drive gear 58 is formed, and bearing support portions and a plurality of external splines are formed. Respective hubs 201 of gear shift clutches 101, 102 are press-fitted on the external splines of the first output shaft 31 through spline fittings. The final reduction drive gear 58 meshes with the ring gear 80 of a differential gear (differential mechanism). Furthermore, the first output shaft 31 has formed thereon support portions which freely rotatably support a 1st speed driven gear 61, a 3rd speed driven gear 63, a 4th speed driven gear 64 and the reverse gear 70.

The second output shaft 32 is supported by the bearings to be rotatable relative to the mission case 11 and the clutch housing 12 and is arranged in the mission case 11 in parallel to the first input shaft 21. Further, like the first output shaft 31, the second output shaft 32 has the final reduction drive gear 68 formed on the outer surface thereof and also has bearing support portions and a plurality of external splines formed on the outer surface thereof. Respective hubs 201 of gear shift clutches 103, 104 are press-fitted on the external splines of the second output shaft 32 through spline fittings. The final reduction drive gear 68 meshes with the ring gear 80 of the differential gear. Furthermore, the second output shaft 32 has formed thereon support portions which freely rotatably support a 2nd speed driven gear 62, a 5th speed driven gear 65, a 6th speed driven gear 66 and a 7th speed driven gear 67.

As shown in FIG. 3, the dual clutch 40 has the first clutch 41 for transmitting the rotational driving power of an internal combustion engine E/G (corresponding to "prime mover" in the present invention) to the first input shaft 21 and the second clutch 42 for transmitting the rotational driving power of the internal combustion engine E/G to the second input shaft 22. The dual clutch 40 is contained in the clutch housing 12 on the right side as viewed in FIG. 2 and is provided concentrically with the first input shaft 21 and the second input shaft 22. The first clutch 41 is connected to the coupling portion of the first input shaft 21, while the second clutch 42 is connected to the coupling portion of the second input shaft 22. Thus, high speed shift changes are possible by switching the connections of the internal combustion engine E/G with the first and second input shafts 21, 22 by the first and second clutches 41, 42 in response to a vehicle control command.

The reverse gear 70 is provided to be freely rotatable on a support portion which is formed on the first output shaft 31 for the reverse gear. Further, in the present embodiment, the reverse gear 70 meshes at all times with a small-diameter gear 62a which is formed bodily with the 2nd speed driven gear 62.

Each of the gear shift clutches 101, 102, 103 and 104 is provided with a hub 201 and a sleeve 202. The hub 201 takes a shape of a hollow disc with an internal spline and an external spline formed thereon and is press-fitted on the external spline of the first output shaft 31 or the second output shaft 32 through spline fitting. Each sleeve 202 meshes with the external spline of each hub 201 to be slidable relative to the hub 201 in the axial direction and, when slidden, is brought into meshing with a synchromesh gear portion of an associated one of the driven gears 61-67 for the respective speed change stages and the reverse gear 70. That is, the sleeves 202 have functions of selectively switching the meshing states and the non-meshing states with the synchromesh gears (not shown) provided on the driven gears 61-67 for the speed change stages or the reverse gear 70, by being axially slidden and of selectively coupling the driven gears 61-67 or the reverse gear 70 with the first output shaft 31 and the second output shaft 32.

As shown in FIG. 1, the ring gear 80 meshes with the final reduction drive gear 58 and the final reduction drive gear 68 and thus, is in driving connection with the first output shaft 31 and the second output shaft 32 at all times. Further, the ring gear 80 is larger in diameter and also larger in the number of teeth than the final reduction drive gears 58, 68. The ring gear 80 is connected to driving road wheels (not shown) through a rotational shaft 80a as shaft member supported in the case 10 and the differential mechanism (not shown). That is, the ring gear 80 of the differential gear is a gear which is constituted as a final gear in the transmission to be rotated at all times during the traveling of the vehicle. Further, the ring gear 80 is located at a lower position than the other gears. Thus, at least a part of the ring gear 80 is immersed in the lubrication oil stored at the bottom portion of the mission case 11 and is able to scoop up the lubrication oil.

The lubrication mechanism 90 has a lubrication oil storage region 91, a receiver 92 and a separator 93 (corresponding to "lubrication oil retention section" in the present invention). As shown in FIGS. 1 and 2, the lubrication oil storage region 91 is a region which stores lubrication oil at the bottom portion of the mission case 11. Further, a part of the lubrication oil storage region 91 is partitioned by a lower part of the separator 93. The lubrication oil storage region 91 enables the stored lubrication oil to be scooped up by the rotation of the ring gear 80 above the ring gear 80. Further, the lubrication oil scooped up by the ring gear 80 splashes above the ring gear 80 and is collected by the receiver 92.

The receiver 92 is a member which is secured by bolt-fastening to an upper part of the case 10 but is different from the mission case 11. As shown in FIG. 2, the receiver 92 is formed with a collecting portion 92a for receiving lubrication oil, at one end of the receiver 92 located in a direction orthogonal to the axis of the ring gear 80. Further, in order to flow the collected lubrication oil to the sliding parts of the transmission 1, the receiver 92 is formed with a gutter-shaped flow channel 92b that extends in the axial direction of the transmission 1. In order that proper quantities of lubrication oil fall or drop to the respective lubrication portions such as tooth surfaces of the respective gears, the gear shift clutches 101-104 and the like, the flow channel 92b is provided with a plurality of falling ports (not shown) over the sliding parts.

Further, the receiver 92 is formed with a supply port 92c at the other end of the receiver 92. The respective shafts such as the first output shaft 31, the second output shaft 32 and the like are formed therein with through holes for flowing lubrication oil therethrough. Further, the mission case 11 is provided with inflow grooves 11a being oil passages for flowing lubrication oil into the through holes of the respective shafts, in a cover bodily formed at an end portion of the mission case 11. Then, the supply port 92c of the receiver 92 is inserted into a cave communicating with the inflow grooves 11a. The receiver 92 flows lubrication oil from the supply port 92c to the cave for the inflow grooves 11a and supplies lubrication oil to the through holes of the first and second output shafts 31, 32 through the inflow grooves 11a.

As shown in FIG. 1, the separator 93 takes the form of an arc as viewed in the axial direction of the transmission 1 and is formed to surround an area of a circumferential part of the ring gear 80 that ranges from the lubrication oil storage region 91 to an outside of the lubrication oil storage region 91. The separator 93 takes a U-letter shape to follow the shape of the axial section at the circumferential part of the ring gear 80. More specifically, the separator 93 is formed to a shape that surrounds a circumferential surface and both side surfaces of the circumferential part of the ring gear 80.

That is, a construction is taken so that the space between the circumferential part of the ring gear 80 and the separator 93 can be maintained to be a predetermined distance. An end portion of the separator 93 on the upper side is formed not to intercept the lubrication oil splashing from the ring gear 80 toward the receiver 92 but to surround the ring gear 80 up to the vicinity of a portion on the circumferential part where the lubrication oil is splashed.

Figure 4:
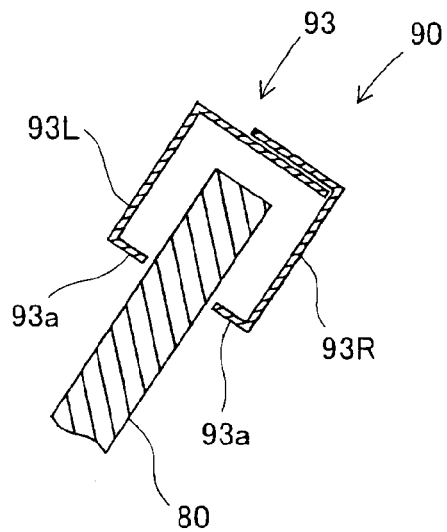
[FIG. 4] is an enlarged view taken along the B-B section in FIG. 1.

Further, the separator 93 is bodily formed with falling prevention portions 93a over a place that is located to range from the end portion on the upper side to a lower side beyond the axis center of the ring gear 80 (in the present embodiment, at the place located above the one-dot-chain line L in FIG. 1). As shown in FIG. 4, by bending an opening portion of the U-letter shape separator 93 toward the inside, the falling prevention portions 93a are formed to come close to the side surfaces of the ring gear 80. Thus, the lubrication oil retained between the ring gear 80 and the separator 93 after being scooped up by the ring gear 80 is retained by the falling prevention portions 93a also on the side surfaces of the ring gear 80.

Further, when scooped up above the axis center of the ring gear 80, the lubrication oil is liable to fall or leak out from the gaps between the separator 93 and the side surfaces of the ring gear 80. Thus, by further providing the falling prevention portions 93a along at least the upper portions of the side surfaces of the ring gear 80 that are above the axis center of the ring gear 80, it is possible to prevent the lubrication oil from falling or leaking out and to retain the lubrication oil of a sufficient oil quantity at the circumferential part of the ring gear 80.

Further, the falling prevention portions 93a may be constructed as members different from the separator 93. However, by forming the falling prevention portions 93a bodily with the separator 93, it becomes easy to position the separator 93 relative to the ring gear 80. Further, by bodily joining or forming the falling prevention portions 93a bodily with the separator 93, the lubrication oil can be prevented from leaking out from clearances between the separator 93 and the falling prevention portions 93a.

Figure 5:
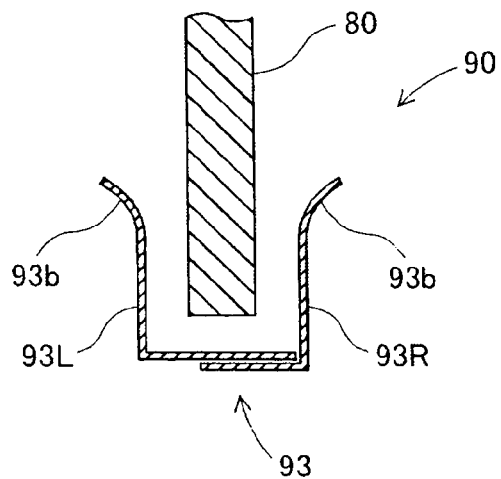
[FIG. 5] is an enlarged view taken along the C-C section in FIG. 1.

Furthermore, the separator 93 has curved potions 93b that are formed to make the U-letter shape opening portion to spread out at a place that ranges from an end portion on the lower side to the falling prevention portions 93a (in the present embodiment, at the place located below the one-dot-chain line L in FIG. 1). As shown in FIG. 5, the curved portions 93b are formed by widening the opening width of the separator 93, so that the lubrication oil splashing or falling in the interior of the mission case 11 is collected into the inside of the separator 93. In the interior of the transmission 1, the lubrication oil is splashed by the ring gear 80, other gears and the like and is circulated.

Thus, by forming the separator 93 with the curved portions 93b, it is possible to collect the lubrication oil that splashes around the lubrication oil storage region 91 or falls from above the ring gear 80, into the inside of the separator 93 and to secure the lubrication oil in the separator 93 in a proper quantity. Therefore, the lubrication oil in a stable oil quantity can be scooped up by the ring gear 80, so that the interior of the transmission 1 can be improved in lubricating ability.

Figure 6:
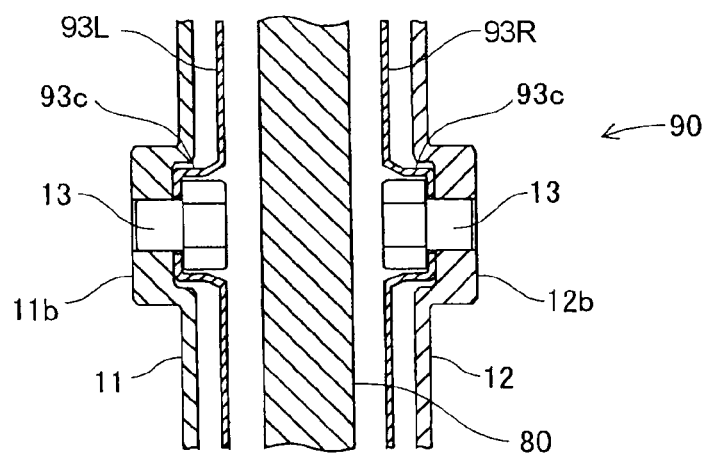
[FIG. 6] is an enlarged view taken along the D-D section in FIG. 1.

Further, in the present embodiment, the separator 93 is constructed to take the U-letter shape in section by overlapping two left and right separable side members 93L, 93R, each taking an L-letter shape in section, at bottom portions thereof. As shown in FIG. 2, the left side member 93L and the right side member 93R of the separator 93 are each provided with four concavities 93c on the side portion thereof. Further, as shown in FIG. 6, the left side member 93L is fastened by means of bolts 13 with the four concavities 93c fitted respectively in four attaching holes 11b formed on the mission case 11. Likewise, the right side member 93R is fastened by means of bolts 13 with the four concavities 93c fitted respectively in four attaching holes 12b formed on the clutch housing 12.

The separator 93 is assembled in such a way that when the clutch housing 12 is brought into contact with, and is secured to, the mission case 11 by bolt-fastening, the two side members 93L, 93R come close to the both side surfaces of the ring gear 80 from the left and right and face the outer circumferential surface of the ring gear 80. Thus, the separator 93 can easily be secured to the case 10 to surround the circumferential surface and the both side surfaces of the circumferential part of the ring gear 80. And, since the two side members 93L, 93R of the separator 93 are fastened by means of the bolts 13 with the concavities 93c fitted respectively in the attaching holes 11b, 12b, the inner surface of the separator 93 becomes flat, so that the lubrication oil scooped up by the ring gear 80 can be flown smoothly.

Further, the end portion on the lower side of the separator 93 is provided in the lubrication oil storage region 91. That is, as mentioned earlier, the lower part of the separator 93 divides the lubrication oil stored in the mission case 11 from the lubrication oil stored around the circumference part of the ring gear 80. This sets the quantity of lubrication oil agitated by the rotating ring gear 80.

<Operation and Effects of Transmission 1>

The following effects are achieved by the transmission 1 constructed as described hereinabove.

The separator 93 of the lubrication mechanism 90 is arranged to surround the circumferential part of the ring gear 80 with the predetermined gap made relative to the ring gear 80. Heretofore, the lubrication oil scooped up in the lubrication mechanism that does not have the separator 93 is likely to separate from the ring gear 80 and to splash or fall in different directions prior to being splashed toward the receiver 92. On the contrary, the lubrication mechanism 90 in the present embodiment is able to retain the lubrication oil scooped up by the rotation of the ring gear 80, between the ring gear 80 and the separator 93. Therefore, it is possible to prevent the lubrication oil from splashing or falling in different directions prior to being splashed toward the receiver 92 and hence, to be able to efficiently scoop up the lubrication oil up to the upper portion of the ring gear 80. Accordingly, the ring gear 80 can splash much more lubrication oil in comparison with the prior art and can supply much more lubrication oil to the receiver 92, so that the transmission 1 can be improved in lubricating ability.

Further, the separator 93 is formed to take the U-letter shape to keep the distance between the circumferential part of the ring gear 80 and the separator 93 a predetermined distance. Thus, the circumferential part of the ring gear 80 is able to scoop up the lubrication oil without imbalance. Further, the separator 93 is constructed to provide the one end in the lubrication oil storage region 91. That is, the separator 93 is immersed at least its end portion on the lower side into the lubrication oil stored in the lubrication oil storage region 91. This enables the separator 93 to retain lubrication oil from the beginning of the scooping of the lubrication oil by the rotation of the ring gear 80. Therefore, the separator 93 can scoop up much more lubrication oil to the position at the upper portion of the ring gear 80 where the lubrication oil is splashed toward the receiver 92.

Furthermore, the lubrication oil stored in the lubrication oil storage region 91 is partitioned by the separator 93, so that a proper quantity of the lubrication oil can be stored around the circumferential part of the ring gear 80. Thus, it is possible to decrease the oil quantity of the lubrication oil agitated by the ring gear 80 and hence, to diminish the agitation resistance. Therefore, the power loss in the transmission can be decreased. In addition, since the lubrication oil is efficiently circulated in the interior of the transmission 1, the oil quantity of the lubrication oil to be stored in the mission case 11 can be decreased.

In the present embodiment, the separator 93 is the member being different from the mission case 11 and is bolt-fastened to the mission case 11 and the clutch housing 12. By making the separator 93 as the different member like this, it is possible to set the shape of the separator 93 adapted to the shape of the ring gear 80 that scoops up lubrication oil. For example, it may be the case that the plurality of gears including the ring gear 80 are replaced in the same mission case 11 for the purpose of alteration in gear ratio in practical use. In this case, by using the separator 93 of the shape that is adapted to the shape of the replaced ring gear 80, the lubrication mechanism 90 can be applied to the plurality of replaced gears. Further, the shape of the separator 93 can be set to be suitable for the oil quantity and kind of the lubrication oil stored in the mission case 11.

Further, the transmission 1 is made to be the automatic dual-clutch transmission that switches the connections of the internal combustion engine E/G with the first input and output shafts 21, 31 and the second input and output shafts 22, 32 by the two clutches 41, 42. Then, the ring gear 80 of the differential gear is used as the member that scoops up the lubrication oil in the lubrication oil storage region 91. The ring gear 80 is the gear that is rotated at all times during the vehicle travelling and is able to scoop up the lubrication oil at all times during the vehicle travelling that requires the lubrication in the interior of the transmission 1. Thus, since the lubrication oil can be supplied stably to the receiver 92, it is possible to efficiently circulate the lubrication oil in the interior of the transmission 1.

Further, it is often the case that generally, the ring gear 80 is large in diameter among the plurality of gears contained in the mission case 11 and is positioned at the lowest place. Therefore, by taking the construction that the ring gear 80 scoops up the lubrication oil, the lubrication oil can be more efficiently scooped up from the lubrication oil storage region 91 that is at the bottom portion of the mission case 11 storing the lubrication oil. Further, the ring gear 80 of the differential gear is constructed as the final gear in the transmission 1. Thus, the agitation resistance exerted on the ring gear 80 is transmitted to the internal combustion engine E/G being a driving source through the plurality of gears that have a reduction gear ratio depending on the shift position. Accordingly, it is possible to diminish the influence that the agitation resistance acting on the ring gear 80 extends to the internal combustion engine E/G.

<Modified Forms of Embodiment>

In the present embodiment, the construction is taken that one end of the separator 93 is provided in the lubrication oil storage region 91. On the contrary, there may be taken a construction that both end portions of the separator 93 are provided outside the lubrication oil storage region 91. In this case, for example, an inflow port for lubrication oil may be formed at the bottom portion of the separator 93, so that the lubrication oil stored in the bottom portion of the mission case 11 is replenished to the inside of the separator 93. The same effects can be performed even in such a construction.

Further, in the present embodiment, the transmission 1 is constructed to be the automatic dual-clutch transmission. On the contrary, the transmission 1 may be made to be an ordinary transmission. In this case, the same effects can be achieved by applying the lubrication mechanism 90 of the present invention to a member such as a gear that scoops up the lubrication oil in the interior of the ordinary transmission.

The invention claimed is:

1. A transmission comprising:
   a case;
   a plurality of gears rotatably supported in the case;
   lubrication oil contained in the case;
   a lubrication oil storage region in a bottom portion of the case, storing the lubrication oil, and enabling the stored lubrication oil to be scooped up by rotation of a first gear of the plurality of gears above the first gear;
   a receiver for flowing the lubrication oil scooped up upward by the rotation of the first gear to sliding parts of the gears; and
   a lubrication oil retention section having a U-letter shape that surrounds a circumferential surface and both side surfaces of a circumferential part of the first gear, the lubrication oil retention section extending from the lubrication oil storage region to an outside of the lubrication oil storage region at a portion on the circumferential part where the lubrication oil is splashed towards the receiver, and the lubrication oil retention section retaining the lubrication oil scooped up by the rotation of the first gear between itself and the first gear at the outside of the lubrication oil storage region and enabling the first gear to splash toward the receiver the lubrication oil retained at the outside of the lubrication oil storage region.

2. The transmission in claim 1, wherein the lubrication oil retention section includes falling prevention portions that retain on side surfaces of the first gear the lubrication oil that is retained by the lubrication oil retention section and that has been scooped up by the rotation of the first gear, the falling prevention portions being bodily joined or formed along upper portions of the side surfaces of the first gear that are above an axis center of the first gear.

3. The transmission in claim 1, wherein the U-letter shape of the lubrication oil retention section below the axis center of the first gear spreads outward.

4. The transmission in claim 1, wherein:
   the lubrication oil retention section includes two side members respectively secured to first and second case sections that constitute the case, and
   the two side members surround the circumferential surface and the both side surfaces of the circumferential part of the first gear with the second case section fastened to the first case section.

5. The transmission in claim 1, wherein the first gear comprises a gear of the plurality of gears that is rotated at all times during a vehicle travelling.

6. The transmission in claim 5, wherein the transmission is an automatic dual-clutch transmission that further comprises:
   a first input shaft and a second input shaft arranged concentrically and rotatably supporting gears on a drive side of the plurality of gears;
   a first output shaft and a second output shaft arranged in parallel to the first input shaft and rotatably supporting gears on a driven side of the plurality of gears; and
   a dual clutch having a first clutch for transmitting a rotational driving power of a prime mover to the first input shaft and a second clutch for transmitting the rotational driving power to the second input shaft;
   wherein the first gear is a ring gear of a differential gear that is rotationally connected to the first and second output shafts at all times.

7. The transmission in claim 2, wherein the falling prevention portions extend in toward the respective side surfaces of the first gear.

8. The transmission in claim 1, wherein respective distances from the lubrication oil retention section to the circumferential surface and to the both side surfaces of the circumferential part of the first gear are kept constant.

9. The transmission in claim 2, wherein the falling prevention portions are formed at an open end of the U-letter shape and respectively bend inwardly to retain the lubrication oil scooped up by the first gear therein.

\* \* \* \* \*